(12) United States Patent
Reiss et al.

(10) Patent No.: US 6,370,819 B1
(45) Date of Patent: Apr. 16, 2002

(54) PLANT WATERING SYSTEM

(76) Inventors: Steven M. Reiss, 393 Bayview Ave., Ventura, CA (US) 93006; Dwayne E. Palmer, 1177 Carlsbad Pl., Ventura, CA (US) 93003

( * ) Notice: Subject to any disclaimer, the term of this patent is extended or adjusted under 35 U.S.C. 154(b) by 0 days.

(21) Appl. No.: 09/438,035

(22) Filed: Nov. 10, 1999

(51) Int. Cl.$^7$ ................................................ A01K 9/04
(52) U.S. Cl. ................................................ 47/81; 47/79
(58) Field of Search ........................ 47/81, 79, 85, 47/83

(56) References Cited

U.S. PATENT DOCUMENTS

| | | | |
|---|---|---|---|
| 910,905 A | 1/1909 | Clements | |
| 2,072,185 A | 3/1937 | Schein | 47/38 |
| 2,081,337 A | 5/1937 | Lockyer | 47/38 |
| 2,084,005 A | 6/1937 | Richards | 47/48 |
| 2,130,234 A | 9/1938 | Haglund | 47/38 |
| 2,135,998 A | 11/1938 | Beyer | 47/38 |
| 2,189,982 A | 2/1940 | Haglund | 47/38 |
| 2,695,474 A | 11/1954 | Barstow | 47/38 |
| 2,810,235 A | 10/1957 | Magid | 47/38 |
| 4,236,353 A | 12/1980 | Sorenson | 47/81 |
| 4,244,147 A | 1/1981 | Geddes | 47/39 |
| 4,420,903 A | 12/1983 | Ritter et al. | 47/81 |
| 4,805,343 A | 2/1989 | Patterson et al. | 47/79 |
| 4,829,709 A | 5/1989 | Centafanti | 47/79 |
| 4,885,869 A | 12/1989 | Kim | 47/66 |
| 4,937,974 A | 7/1990 | Costa, Jr. et al. | 47/81 |
| 5,099,609 A | 3/1992 | Yamauchi | 47/81 |
| 5,622,004 A | * 4/1997 | Gidge | 47/71 |
| 5,644,868 A | 7/1997 | Lui | 47/81 |
| 6,079,156 A | * 6/2000 | Colovic | 47/81 |

* cited by examiner

*Primary Examiner*—Peter M. Poon
*Assistant Examiner*—Floris Copier
(74) *Attorney, Agent, or Firm*—Kenneth J. Hovet Law Offices; Kenneth J. Hovet; Arthur K. Samora

(57) ABSTRACT

A plant watering system in accordance with the present invention includes a container having a bottom formed with a plurality of drain openings and a plurality of leg structures. Each leg structure has a lower section which is separated from an upper section by an abutment structure. The leg structures are formed of a material that provides sufficient structural integrity for supporting the container and the associated soil and plant therein. The upper section of each leg structure is inserted into a respective opening to thereby engage the abutment structure with the bottom of the container. The container is then placed in a reservoir of water. With this configuration, the lower sections of the leg structures extend into water. The leg structures draw water from the reservoir and deliver the water to the soil and plant roots. At the same time, the leg structures function to space-apart the reservoir from the container to prevent direct contact between the container bottom and the water.

15 Claims, 3 Drawing Sheets

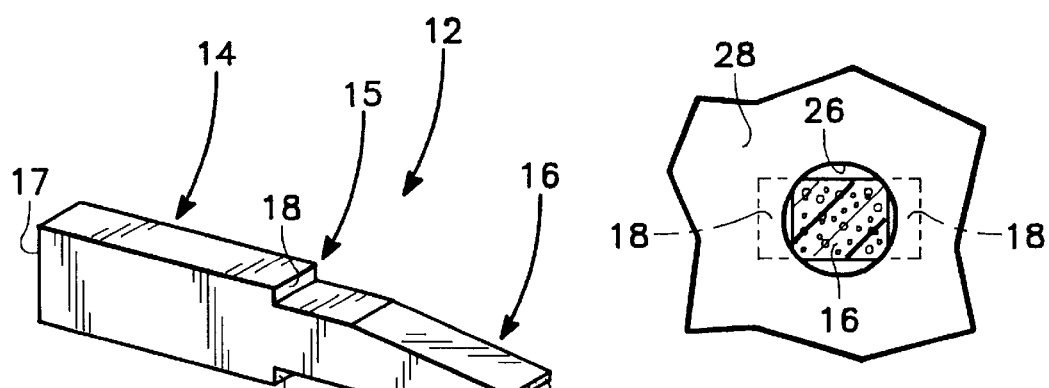
FIG. 1
FIG. 3
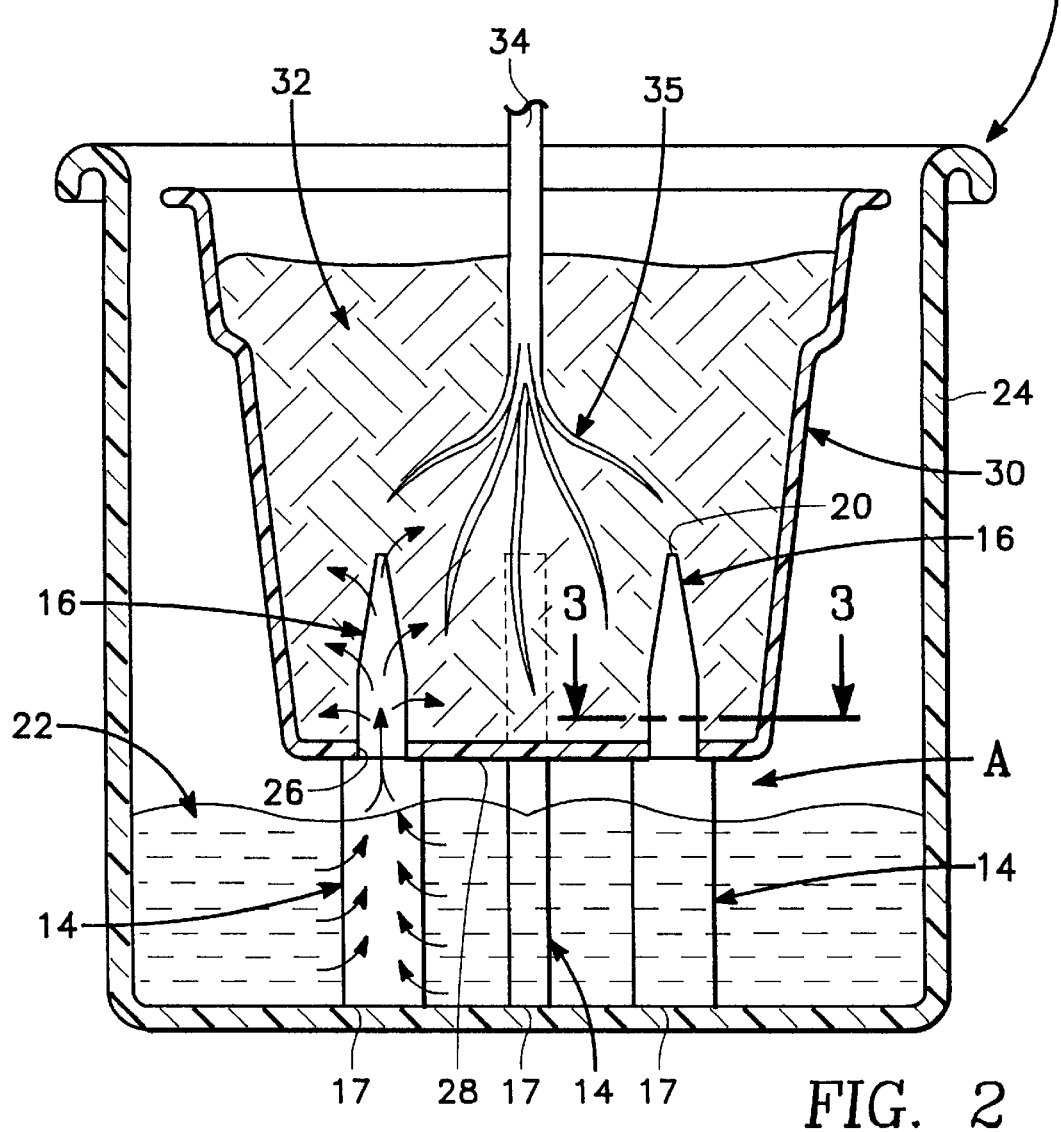
FIG. 2

PLANT WATERING SYSTEM

FIELD OF THE INVENTION

The present invention pertains generally to devices for watering plants. More specifically, the present invention pertains to leg structures which transport water from a reservoir to plants growing in a container while simultaneously providing structural support for positioning the container in relation to the reservoir.

BACKGROUND OF THE INVENTION

Plant nurseries have been selling seedlings for many years. In a plant nursery, a seedling is usually packaged in a temporary container, so that the seedling can be easily and inexpensively transported once it is sold. For this purpose, the containers are filled with a growing medium such as soil, and the seedling is planted in the soil. These temporary containers are typically containers that have several drain openings in the bottom to allow excess water to drain from the container and to aerate the soil.

Like all plants, the seedlings need water to survive. Because each seedling is enclosed in a discrete container, each seedling must be watered separately. For locations where a large number of seedlings in containers are located, the watering process can be very time consuming and labor intensive. This is particularly true for a commercial plant nursery, where large numbers of seedlings in containers are concentrated. But even for homes and offices with several potted plants, watering the plants can be very time intensive and inconvenient. For this reason, it is desirable to increase the time between plant watering cycles.

Sub-irrigation techniques are sometimes used to increase the watering cycle of a potted plant. Specifically, the plant is watered through the drain openings in the bottom of the container. Rope-like plant wicks are well known in the prior art for this watering technique. One portion of a wick is inserted through the drain opening into the soil in the container and the other end is placed in a reservoir of water. With this configuration, the wick moves water from the reservoir to the plant root zone.

When wicks are used to water potted plants, it is also desirable to lift the container out of the water reservoir, to prevent direct contact between the container (and the associated plant and soil therein) and the water. This is because direct contact may cause the soil in the container to absorb excess water, with adverse consequences for the respective plant. Further, the temporary container is typically made of an inexpensive material which is relatively flimsy, such as cardboard or a plastic material, and is susceptible to water damage. Direct contact between the container and the water reservoir may cause water damage to the container. A damaged container may fail during transport which, of course, is an undesirable condition.

Wicks for transporting water from a reservoir to a plant container are known in the prior art. For example, U.S. Pat. No. 4,244,147, which issued to Geddes for an invention entitled "Flower Pot Holders", discloses a wick which is dipped into a water reservoir. Geddes, however, discloses a ribbon-like wick that is flexible. As such, the wick in Geddes does not have sufficient structural integrity for supporting a container. Similarly, U.S. Pat. No. 4,829,709, which issued to Centafanti for an invention entitled "Self-Watering Flower Pot", discloses a wick element which transports water from a lower receptacle to a plant container. Centafanti's wick, however, lacks sufficient structural integrity for supporting the container and must be placed within a perforated tube in order to irrigate the plant container. For support, the plant container must be placed on a cover which is placed over the lower receptacle.

In light of the above, it is an object of the present invention to provide a device for watering plants that uses a wick to deliver water from a reservoir to a plant in a container. It is another object of the present invention to provide a device for watering plants with a wick that more efficiently waters the plants, thereby allowing for a longer watering cycle. It is another object of the present invention to provide a device for watering plants that provides sufficient structural integrity to support the container and keep the plant and container separate from the water in the reservoir. It is another object of the present invention to provide a device for watering plants that is relatively simple to use, is relatively easy to manufacture and is comparatively cost effective.

SUMMARY OF THE INVENTION

A plant watering system in accordance with the present invention includes a reservoir containing water and a container (or receptacle) which has a bottom with a plurality of drain openings. The container is filled with a growing medium within which are planted one or more plants. Preferably, the container is made of a relatively inexpensive material that is designed for temporary storage of the plant. Examples of such a material are plastic or cardboard.

The system also includes one or more leg structures (wicks) having a water transport means for moving water from the reservoir to the growing medium. The leg structures have a given length determined by the depth and width of the container being used. Each leg structure is defined by a lower section adjacent to a mid-section which extends to an upper section. The mid-section includes a constraint means that interacts with the container bottom to connect the leg structure to the container.

The leg structures are made of a material that has sufficient structural integrity to collectively support the weight of the container and the associated growing medium and plant (s) that are contained therein. To provide this support, the upper section of each leg structure is inserted into a respective opening in the container until the upper section is embedded in the growing medium. In this position, the constraint means will be engaged with the bottom of the container adjacent the openings. The container is then positioned so that the lower section of each leg structure will rest upon a reservoir support surface while also being in contact with water in the reservoir.

The diameter relationships between the drain openings of the container and the upper section and abutment structure create a basic version of the constraint means. Specifically, the maximum diameter of the upper section of the leg structure must be less than the minimum opening diameter This will then allow the upper section to completely pass through the opening. Further, the maximum width of the abutment structure must be greater than the maximum diameter of the opening so that the abutment structure can engage the container adjacent the opening when the upper section extends a given distance into the growing medium. With this configuration, the leg structure will function to support the container and its contents, while also providing a water flow means into the plant growing medium.

Where appearance is important, the water reservoir may comprise a decorative pot having a closed bottom to retain water. The inside bottom of the pot will provide the surface upon which the lower leg section will rest. The height of the decorative pot walls will exceed the cumulative height of the container and leg structure lower section so that a casual observer will only see a plant growing out of an attractive pot.

To prevent damage to the plant and container, the leg structure lower section will have sufficient longitudinal extent to permit use of an ample supply of water while also maintaining a space between the water reservoir and container bottom. This arrangement allows fresh air to move beneath the container and inhibit formation of mold and fungus.

BRIEF DESCRIPTION OF THE DRAWINGS

The novel features of this invention will be best understood from the accompanying drawings, taken in conjunction with the accompanying description, in which similar characters refer to similar parts, and in which:

FIG. 1 is an isometric perspective view of a basic polygonal leg structure of the present invention.

FIG. 2 is a cross-sectional view of the overall plant watering system of the invention using the basic leg structure shown in FIG. 1.

FIG. 3 is a fragmentary cross-sectional view taken along lines 3—3 of FIG. 2.

WRITTEN DESCRIPTION OF THE PREFERRED EMBODIMENT

Figure 4:
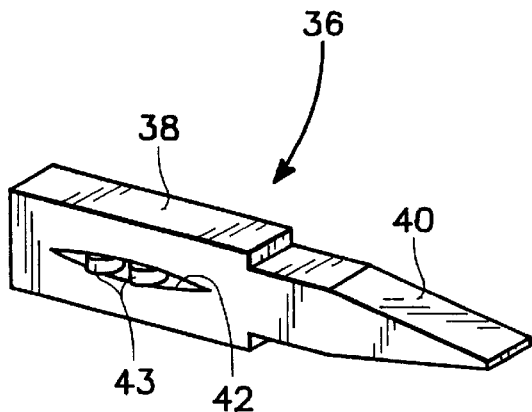
FIG. 4 is an isometric view of a first alternative embodiment of the leg structure shown in FIG. 1 with a pocket.

With reference to FIGS. 1 and 2, the plant watering system in accordance with the present invention is shown generally by arrow 10. The system includes an elongated leg structure 12 that has a lower section 14 and an upper section 16. The two sections are separated by a constraint means at a mid-section 15. The constraint means comprises an abutment structure shown as shoulders 18. In the preferred embodiment, the lower section extends from a base 17 to the mid-section in a rectangular configuration. The upper section 16 initially extends from the abutment structure also in a rectangular shape. It then tapers inwardly to a top edge 20, as best shown in FIG. 1. The length of each section is predetermined in relation to the particular container and reservoir being used.

Referring now to FIG. 2, the leg structure 12 is shown in its operational environment. Specifically, a container (receptacle) 30 is provided which is substantially filled with a growing medium 32. The growing medium may comprise any one or combination of media known in the art such as soil, clay, sand, foamed polystyrene, sponge, moss and compost.

Planted in the medium is one or more plants 34 having roots 35. The container includes a bottom 28 through which one or more openings 26 extend. Typically, the container 30 will comprise an inexpensive commercial receptacle of plastic material having drainage openings extending at least through the container bottom.

The aforementioned upper section 12 is sized to pass through a drain opening and extend into the growing medium an effective distance that is sufficient to provide water to roots 35. Preferably, at least portions of the cross-sectional shape of the leg mid-section 15 slightly exceed corresponding portions of opening 26 so that frictional engagement will occur. This is illustrated in FIG. 3 wherein the rectangular corners of the upper section adjacent shoulders 18, are partially crushed inwardly. Such engagement will tend to hold the leg structure in place when not functioning as a gravity support means.

Upon reaching the above effective distance, shoulders 18 will engage respective portions of container bottom 28 adjacent the periphery of opening 26. It is expected that the shoulders, or any of the alternative abutment structures, will preferably be aligned and/or be coextensive so that the leg structure will be vertical and parallel to the container longitudinal axis.

Figure 8:
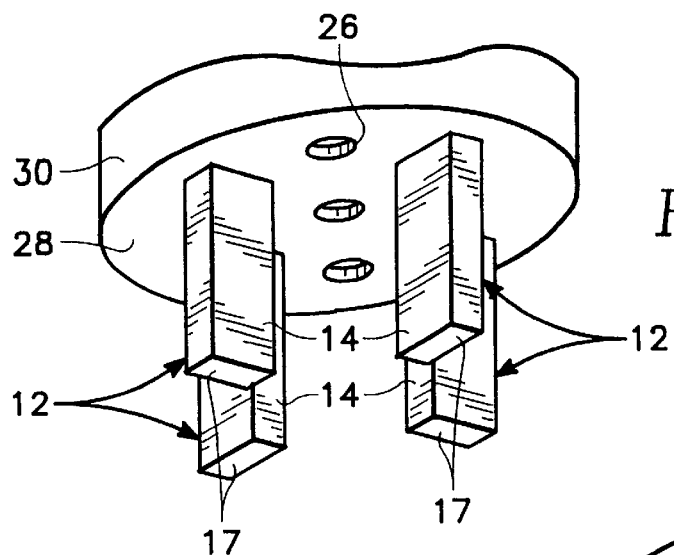
FIG. 8 is an isometric fragmentary view showing the leg structures of FIG. 1 or 2 engaged with drain openings at the bottom of a container.

It is also preferred that at least three leg structures be used in a tripod orientation as shown in FIG. 2. In this way, an evenly balanced support and watering system will result for the container with a minimum of leg structures. FIG. 8 depicts a heavy duty orientation whereby four leg structures 12 are shown inserted into drain openings 26. The leg structures are evenly spaced-apart and aligned so that their midplanes pass through the container center axis.

Figure 9:
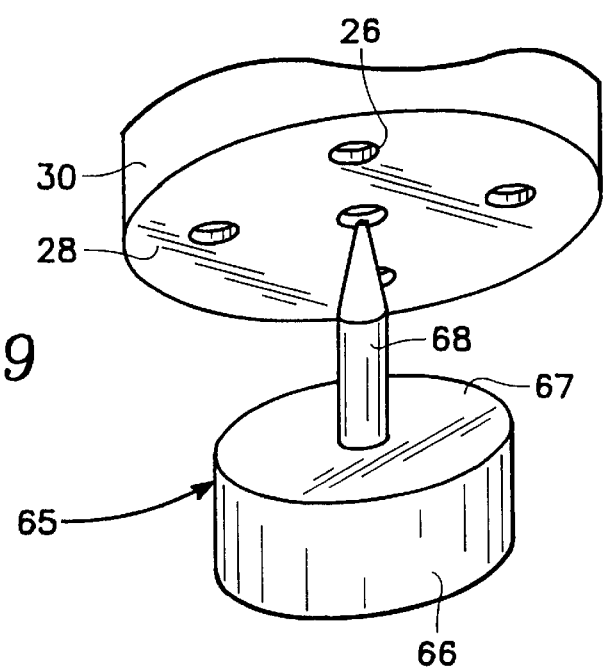
FIG. 9 is an exploded isometric view of a fifth alternative embodiment of a leg structure with a large round lower section useful with the invention showing a singular upper section being inserted into a drain opening at the bottom of a container.

If just one leg structure is used, the lower section should have a large diameter to provide a stable balanced container support means. This embodiment is illustrated in FIG. 9 wherein leg structure 65 comprises a round lower section 66 having a diameter about equal to or greater than the radius of bottom 28. The lower section has a flat top surface 67 from which extends an upper section 68 The shape of the upper section is a matter of choice dictated by the factors aforementioned.

Figure 10:
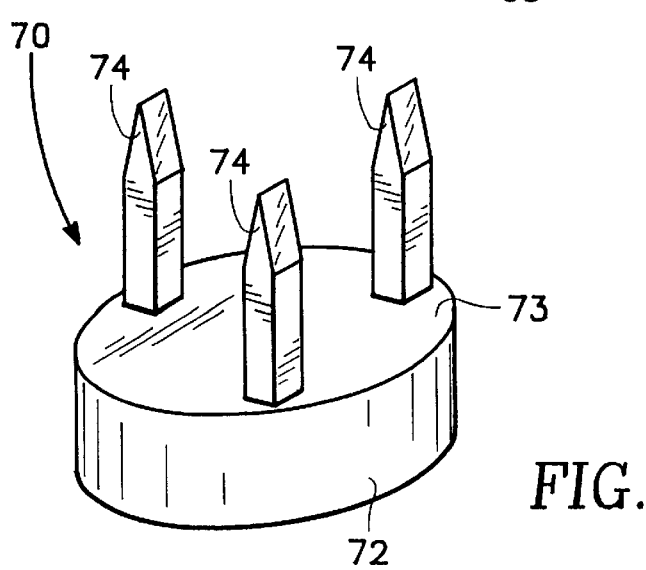
FIG. 10 is an isometric view of a sixth alternative embodiment of a leg structure useful with the invention having three upper sections which are fixed to an enlarged lower section.

It is also within the purview of the present invention to provide a large diameter lower section with two or more upstanding upper sections. In such case, the size and orientation of the container drain openings will have to be predetermined. An example of the above is shown in FIG. 10. Leg structure 70 includes a lower section 72 which may be characterized as a large diameter pedestal. It has a top face 73 which is preferably flat. Upstanding from the face are three upper polygonal sections 74. As before, the upper section shape is a matter of choice. However, they are oriented about top face 73 to match the drain opening pattern of whatever container is being used.

Figure 5:
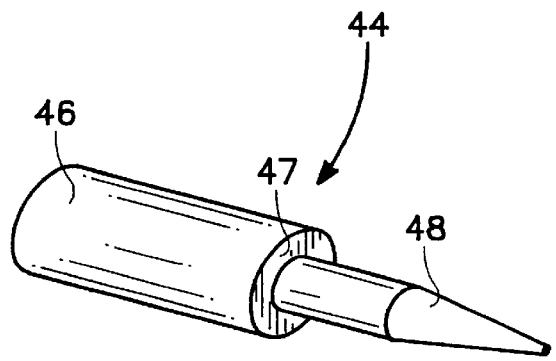
FIG. 5 is an isometric view of a second alternative embodiment of a cylindrical leg structure that can be used with the invention.

With respect to other alternative leg structures, FIG. 5 illustrates a cylindrical leg structure 44. This comprises a cylindrical lower section 46 which terminates at an annular surface 47. Extending coaxially from the annular surface is a reduced-diameter bullet shaped upper section 48.

Figure 6:
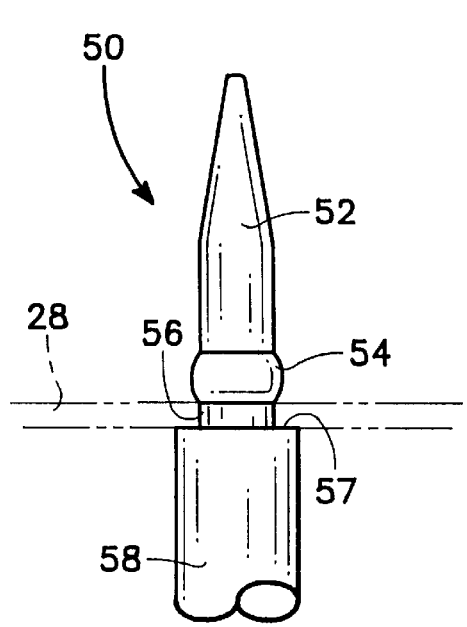
FIG. 6 is an elevational view of a third alternative embodiment of a leg structure that can be used with the invention which is engaged with the bottom of a container shown in phantom.

FIG. 6 is a fragmentary side view of a variation of cylindrical leg structure 44. The variation is referenced as a bottom adapter leg structure 50. It includes a cylindrical lower section 58 that terminates at ring surface 57. The ring surface functions as the previously described abutment structure.

Extending upwardly from the ring surface is a neck portion 56. The neck portion has a size and shape that is coextensive with drain openings 26. Extending from the neck portion is collar 54 which has a diameter slightly larger than openings 26. The collar merges into upper section 52 which is shaped similar to upper section 48 in the second alternative embodiment.

Because the leg structure construction material is porous and somewhat resilient, the collar will flex inwardly as it passes through opening 26 during insertion of the upper section 52. After the collar passes through the opening, it will expand to its original diameter. In this way, it functions as a retention means in cooperation with ring surface 57 to hold the leg structure in place.

Figure 7:
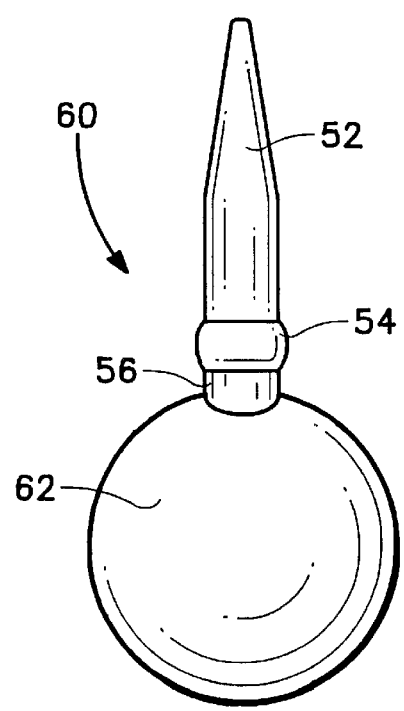
FIG. 7 is a side elevational view of a fourth alternative embodiment of a leg structure with a spherical lower section useful with the present invention.

FIG. 7 depicts a globe leg structure 60. In this version, lower section 62 has a spherical shape to provide more surface area and mass to conduct water into the upper section and growing medium. Any of the above-described upper sections could be utilized with the sphere. As shown, the upper section of FIG. 6 is connected to the sphere.

With the leg structure properly connected to the container base as above described, the container is positioned proximate to a water reservoir so that the lower section will be in contact with a source of water. In some commercial applications, the lower section could extend into a reservoir comprising a trough of moving water. In a home or office, the water reservoir would typically comprise a decorative vase or pot 24 having a closed bottom to retain given amounts of water 22. Other types of reservoirs that could be used are saucers, cups, pans, water retention bags, tanks, bowls, housings, buckets, pails, troughs and beverage ware.

When in contact with water, the leg structure will commence transporting water by absorption and/or capillary action from the reservoir up the length of the leg structure and into the growing medium as depicted by the arrows shown in FIG. 2. The growing medium will diffuse the water into the plant root zone until the growing medium saturation point has been reached—at least in the area about the upper section. At this point, water movement will slow or stop until the plant requires more water.

The rate of water usage will be determined by ambient conditions around the plant growing system, the container size, plant requirements, size, character and number of leg structures. A significant feature of the invention is that it is flexible and allows for coordination of the above factors into an integrated system to achieve a healthy plant requiring low maintenance and infrequent watering.

To maximize the time between watering cycles, it is desirable to maximize the amount of water in the reservoir. Providing an elongated lower section 14 is helpful to allow for greater water depth in the reservoir. However, it is also important to maintain the water level apart from container bottom 28. This will create an air space shown by arrow A in FIG. 2. The air space will permit fresh air to flow beneath the container and inhibit mold and fungus formation.

It is expected that the leg structures will be constructed of porous or sintered plastic materials, clay materials, ceramics, foamed resin composites, sponge materials, cellulose materials or fibrous materials. The fibers are preferably aligned with the longitudinal axis of the leg structure. All of the materials should be closely packed to create small flow channels for water to flow by capillary action.

Examples of the above are found in fiber molded ink pen tips. Water flow can also occur by absorption processes. Examples of materials for this action are the felt tips used with large marker pens.

To enhance plant growth, the reservoir water could be treated with plant growth materials such as time-release fertilizers, beneficial bacteria, fungicides, larvicides and wetting agents. Alternatively, the above materials could be incorporated into the leg structure by pre-impregnation or by the physical placement of crystals, spikes or tablets. As shown in FIG. 4, the lower section sidewall 38 of first alternative wick 36 is provided with a pocket 42. The pocket is sized to accommodate tablets 43 which may consist of any one or combination of the aforementioned plant growth materials. Movement of water through the leg structure will dissolve or entrain the materials and carry them into the growing medium.

While the particular plant watering system, as herein shown and disclosed in detail, is fully capable of obtaining the objects and providing the advantages above stated, it is to be understood that the presently preferred embodiments are merely illustrative of the invention. As such, no limitations are intended other than as defined in the appended claims.

What is claimed is:

1. A plant growing system comprising:
    a reservoir having a base from which extends a side wall defining an open top, said reservoir containing water;
    a receptacle containing a plant growing medium and a plant having roots in said growing medium;
    said receptacle having a bottom with at least one open;
    a leg structure having a monolithic unitary construction within which a continuous flow path for said water is provided, said leg structure extending through said opening and having an upper section that extends into said growing medium and a lower section that is integral with said upper section and extends below said bottom into engagement with said reservoir;
    said lower section being in contact with said reservoir and said water and having sufficient structural integrity to support said receptacle; and,
    said leg structure constructed of one or a combination of members selected from the group consisting of a water absorbing material and a material that moves water by capillary action.

2. The system of claim 1 wherein said opening has an overall minimum diameter and said upper section has an overall maximum diameter, said leg structure having a midsection between said upper section and said lower section with a maximum width that is greater than the minimum diameter of said opening.

3. The system of claim 1 wherein said leg structure includes a constraint means between said lower section and said upper section for connecting said leg structure to said receptacle.

4. The system of claim 3 wherein said constraint means is a member selected from the group consisting of a leg structure shoulder, tapered shape, rib, peg, crosspin, ring and projection.

5. The system of claim 1 wherein said reservoir comprises a water retention member selected from the group consisting of saucer, cup, pot, pan, bag, tank, bowl, housing, bucket, pail, trough, beverage ware and vase.

6. A system for separating a plant container from a reservoir containing water comprising;
    a container having a bottom with at least one opening and containing plant growing medium;

at least one wick comprising an integrated lower section and an upper section having an abutment which is located between said upper section and lower section, said lower section extending into said water and into contact with said reservoir, said upper section extending through said opening into contact with said medium, said abutment engaging said bottom adjacent said opening;

said wick having sufficient structural integrity for supporting said container above said water; and, said wick having a monolithic unitary construction within which said water moves in an uninterrupted path from said reservoir to said growing medium.

7. The system of claim 6 wherein said lower section and said upper section have rectangular cross-sections, said upper section having a top edge from which extends an inclined portion.

8. The system of claim 6 wherein said reservoir comprises a member selected from the group consisting of saucer, cup, pot, pan, bag, tank, bowl, housing, bucket, pail, trough, beverage ware and vase.

9. The system of claim 6, wherein said reservoir contains water at a level that is below said abutment.

10. The system of claim 6 wherein plant growth materials are pre-incorporated into said wick.

11. The system of claim 10 wherein said materials are chosen from a group consisting of time-release fertilizers, beneficial bacteria, fungicides, larvicides and wetting agents.

12. A plant watering assembly comprising:

a reservoir containing water, said reservoir having a base;

a container located above said water having a bottom with at least one opening, said container holding a growing medium with a plant having roots that extend into said medium;

at least one rigid wick having a lower section and an upper section which arm integrated to form an uninterrupted flow path for said water, said rigid wick having a constraint means for engaging said bottom adjacent said opening;

said lower section extending below said bottom, through said water and into contact with said base, said lower section having sufficient structural integrity to support said container; and, said upper section extending through said opening into said growing medium.

13. The assembly of claim 12 wherein materials for facilitating plant growth are pre-incorporated into said rigid wick.

14. The assembly of claim 13 wherein said materials are selected from a group consisting of time-release fertilizers, beneficial bacteria, fungicides, larvicides and wetting agents.

15. The assembly of claim 12 wherein said opening has an overall minimum diameter and maximum diameter, wherein said upper section has an overall maximum diameter that is less than the overall minimum diameter of said opening, said constraint means comprising an abutment structure appurtenant to said wick having an overall maximum width that is greater than the overall maximum diameter of said opening.

* * * * *